United States Patent
Deming et al.

(10) Patent No.: US 9,569,348 B1
(45) Date of Patent: Feb. 14, 2017

(54) METHOD FOR AUTOMATIC PAGE TABLE COMPRESSION

(75) Inventors: James Leroy Deming, Madison, AL (US); Mark Allen Mosley, Guntersville, AL (US); William Craig McKnight, Harvest, AL (US)

(73) Assignee: NVIDIA Corporation, Santa Clara, CA (US)

( * ) Notice: Subject to any disclaimer, the term of this patent is extended or adjusted under 35 U.S.C. 154(b) by 1266 days.

(21) Appl. No.: 12/842,876

(22) Filed: Jul. 23, 2010

Related U.S. Application Data (60) Provisional application No. 61/244,855, filed on Sep. 22, 2009.

(51) Int. Cl.
| | |
|---|---|
| *G06F 12/00* | (2006.01) |
| *G06F 12/10* | (2016.01) |
| *G06F 12/12* | (2016.01) |
| *G06F 12/08* | (2016.01) |

(52) U.S. Cl.
CPC .............. *G06F 12/00* (2013.01); *G06F 12/08* (2013.01); *G06F 12/10* (2013.01); *G06F 12/12* (2013.01); *G06F 12/0813* (2013.01); *G06F 12/0875* (2013.01)

(58) Field of Classification Search
USPC .......... 711/137, 207, 213, E12.001, E12.061
See application file for complete search history.

(56) References Cited

U.S. PATENT DOCUMENTS

| | | | | |
|---|---|---|---|---|
| 5,696,927 | A * | 12/1997 | MacDonald et al. | 711/207 |
| 2011/0010521 | A1* | 1/2011 | Wang et al. | 711/207 |
| 2011/0072235 | A1* | 3/2011 | Deming | G06F 12/1027 711/207 |
| 2014/0237189 | A1* | 8/2014 | Glasco | G06F 12/0875 711/133 |

* cited by examiner

*Primary Examiner* — Midys Rojas
(74) *Attorney, Agent, or Firm* — Artegis Law Group, LLP (57) ABSTRACT

One embodiment of the present invention sets forth a technique for performing a method for compressing page table entries (PTEs) prior to storing the PTEs in a translation look-aside buffer (TLB). A page table entry (PTE) request is received for a PTE that is not stored in the TLB. The PTE as well as a plurality of PTEs that are adjacent to the PTE are retrieved from a memory. The PTE and the plurality of PTEs are compressed and then stored in the TLB.

21 Claims, 10 Drawing Sheets

Figure 8 ns, which are illustrated in the appended drawings. It is to be noted, however, that the appended drawings illustrate only typical embodiments of this invention and are therefore not to be considered limiting of its scope, for the invention may admit to other equally effective embodiments.

METHOD FOR AUTOMATIC PAGE TABLE COMPRESSION

CROSS-REFERENCE TO RELATED APPLICATIONS

This application claims priority benefit to United States provisional patent application titled, "Method for Automatic Page Table Compression," filed on Sep. 22, 2009 and having Ser. No. 61/244,855.

BACKGROUND OF THE INVENTION

Field of the Invention

The present invention generally relates to the compression of page table entries (PTEs) as they are read from a memory and stored into a translation lookaside buffer (TLB).

Description of the Related Art

Modern graphics processing units (GPU), central processing units (CPU), and operating systems (OS) manage memory using virtual addressing. Application programs and the engines within the GPU and CPU use virtual addresses. The operating system and/or driver allocate physical memory for ranges of virtual addresses and specify the mapping between virtual and physical addresses using page tables. A page table entry (PTE) describes the mapping for a range of virtual addresses to a range of physical addresses. The translation from virtual addresses to physical addresses is performed by a memory management unit (MMU) that may be configured to cache PTEs in order to improve the performance by eliminating the need to read PTEs for every translation.

The efficiency of caching the PTEs improves as the number of PTEs capable of being stored in the cache increases. This may be accomplished through physically increasing the size or storage capacity of the cache. However, such physical changes are often costly and undesirable.

Accordingly, what is needed in the art is a system and method for increasing the storage capacity of a cache without modifying the physical attributes of the cache.

SUMMARY OF THE INVENTION

A system and method for an improved technique for compressing page table entries (PTEs) prior to storing the PTEs in a translation look-aside buffer (TLB). A page table entry (PTE) request is received for a PTE that is not stored in the TLB. The PTE as well as a plurality of PTEs that are adjacent to the PTE are retrieved from a memory. The PTE and the plurality of PTEs are compressed and then stored in the TLB.

Various embodiments of a system of the invention compress page table entries (PTEs) prior to storing the PTEs in a translation look-aside buffer (TLB). The system includes a memory management unit (MMU) that comprises a translation lookaside buffer (TLB) and a PTE compression unit. The PTE compression unit receives a page table entry (PTE) request for a PTE that is not stored in the TLB. The PTE compression unit retrieves, from a main memory, the PTE as well as a plurality of PTEs that are adjacent to the PTE. The PTE compression unit then compresses the PTE and the plurality of PTEs and stores the compressed PTEs in the TLB.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
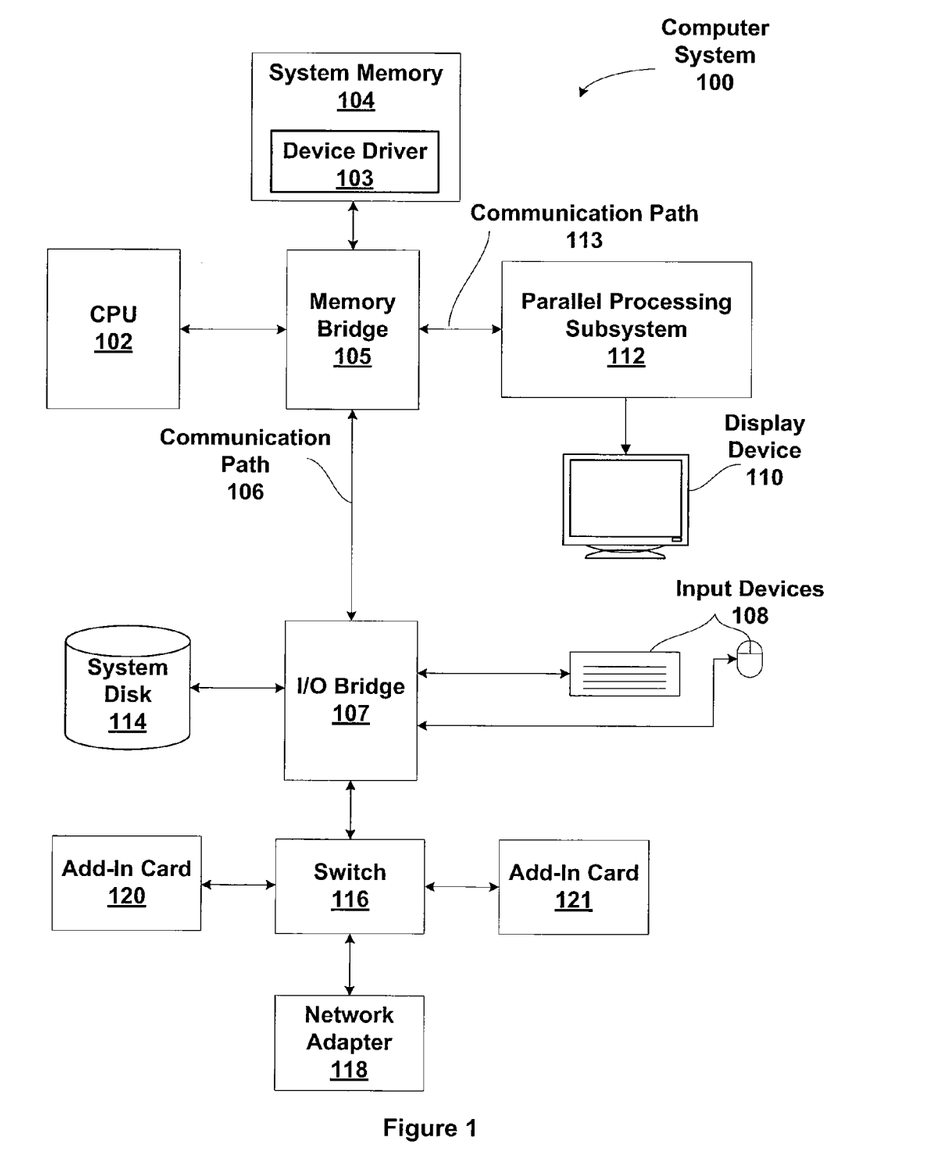
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
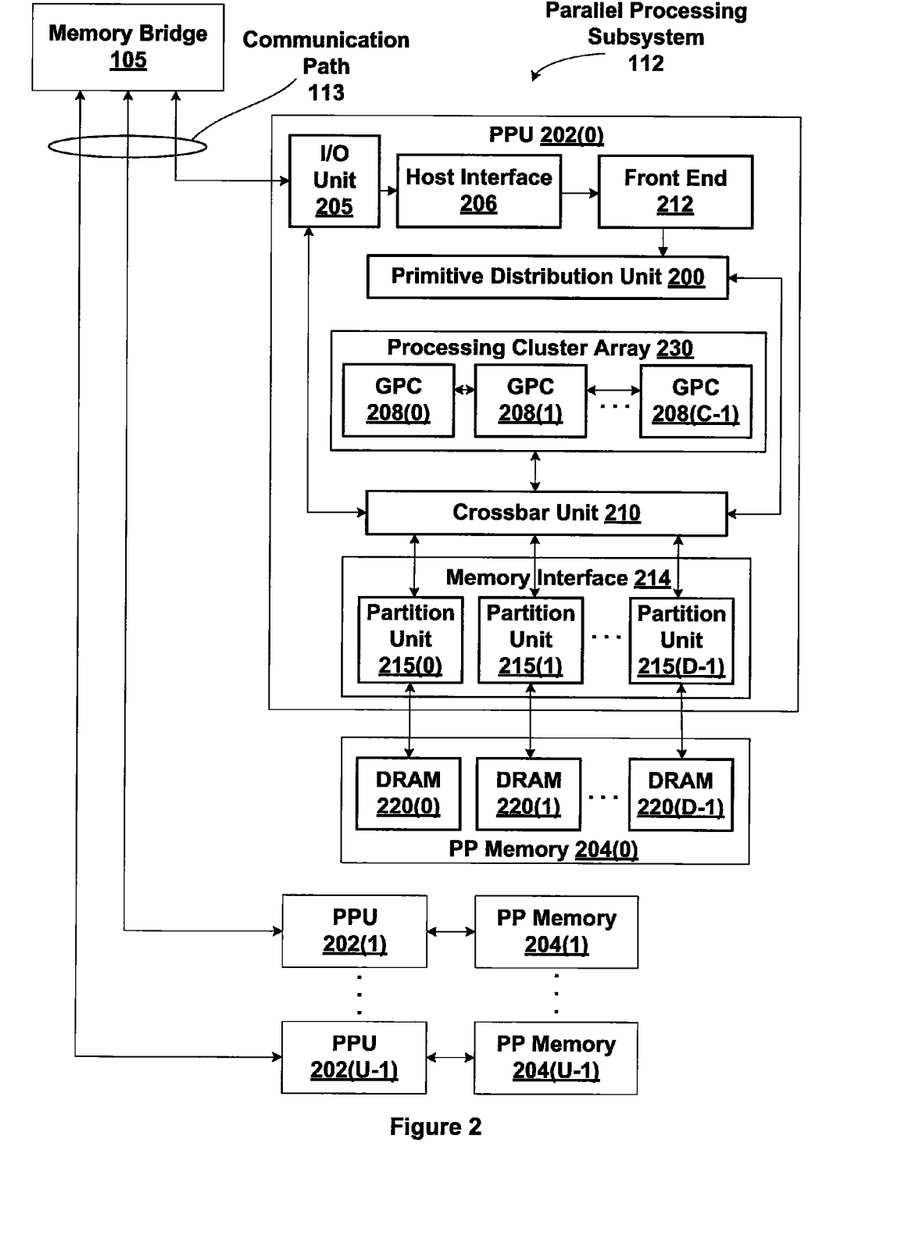
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers that PPUs 202 may read in response to commands in the command buffer. Each command and data buffer may be read by each of PPUs 202.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary depending on the workload arising for each type of program or computation. Alternatively, GPCs 208 may be allocated to perform processing tasks using a time-slice scheme to switch between different processing tasks.

GPCs 208 receive processing tasks to be executed via a work distribution unit 200, which receives commands defining processing tasks from front end unit 212. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the processing tasks, may receive the pointers from front end 212, or may receive the data directly from front end 212. In some embodiments, indices specify the location of the data in an array. Front end 212 ensures that GPCs 208 are configured to a valid state before the processing specified by the command buffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing tasks efficiently accommodates any expansion and contraction of data produced by those different types of processing tasks. Intermediate data produced by GPCs 208 may be buffered to allow the intermediate data to be transmitted between GPCs 208 with minimal stalling in cases where the rate at which data is accepted by a downstream GPC 208 lags the rate at which data is produced by an upstream GPC 208.

Memory interface 214 may be partitioned into a number D of memory partition units that are each coupled to a portion of parallel processing memory 204, where D≥1. Each portion of parallel processing memory 204 generally includes one or more memory devices (e.g. DRAM 220). Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
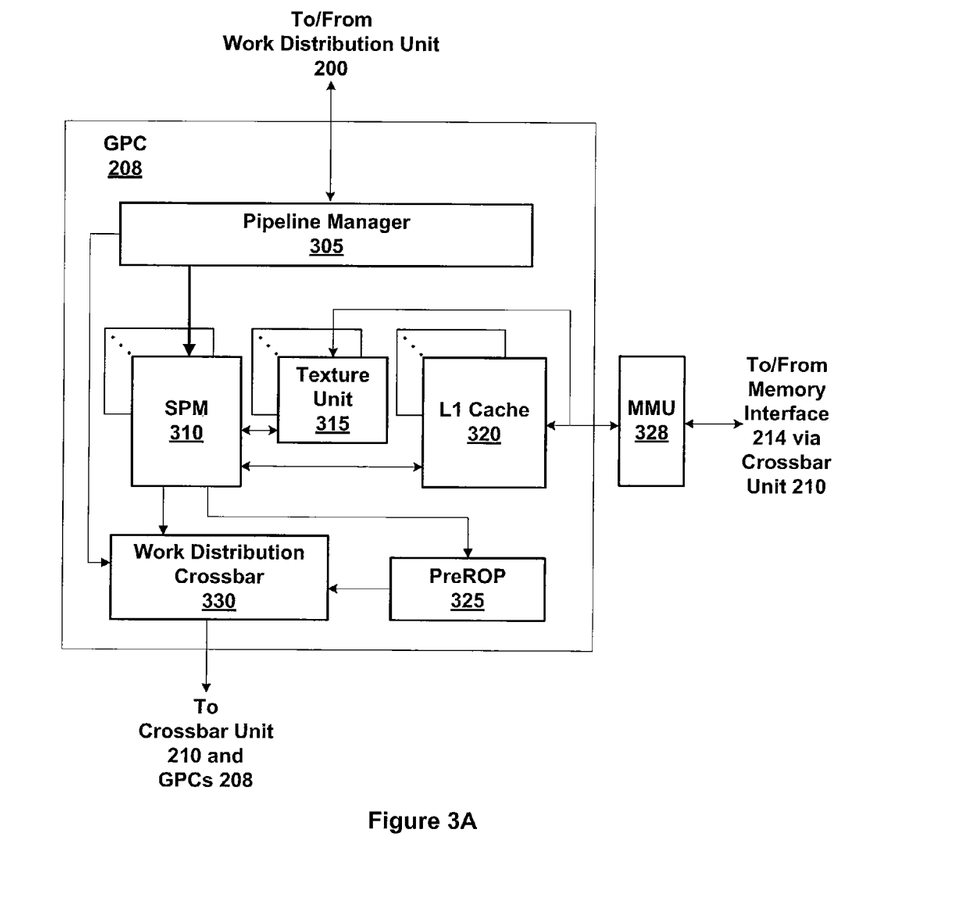
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPC 208 may be configured to implement a primitive engine for performing screen space graphics processing functions that may include, but are not limited to primitive setup, rasterization, and z culling. The primitive engine receives a processing task from work distribution unit 200, and when the processing task does not require the operations performed by primitive engine, the processing task is passed through the primitive engine to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. The series of instructions transmitted to a particular GPC 208 constitutes a thread, as previously defined herein, and the collection of a certain number of concurrently executing threads across the parallel processing engines (not shown) within an SPM 310 is referred to herein as a "thread group." As used herein, a "thread group" refers to a group of threads concurrently executing the same program on different input data, with each thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over multiple clock cycles. Since each SPM 310 can support up to G thread groups concurrently, it follows that up to G×M thread groups can be executing in GPC 208 at any given time.

Additionally, a plurality of related thread groups may be active (in different phases of execution) at the same time within an SPM 310. This collection of thread groups is referred to herein as a "cooperative thread array" ("CIA"). The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

An exclusive local address space is available to each thread, and a shared per-CTA address space is used to pass data between threads within a CTA. Data stored in the per-thread local address space and per-CTA address space is stored in L1 cache 320, and an eviction policy may be used to favor keeping the data in L1 cache 320. Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. An L2 cache may be used to store data that is written to and read from global memory. It is to be understood that any memory external to PPU 202 may be used as global memory.

Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The physical address is processed to distribute surface data access locality to allow efficient request interleaving among partition units. The cache line index may be used to determine whether of not a request for a cache line is a hit or miss.

In graphics applications, a GPC 208 may be configured such that each SPM 310 is coupled to a texture unit 315 for performing texture mapping operations, e.g., determining texture sample positions, reading texture data, and filtering the texture data. Texture data is read via memory interface 214 and is fetched from an L2 cache, parallel processing memory 204, or system memory 104, as needed. Texture unit 315 may be configured to store the texture data in an internal cache. In some embodiments, texture unit 315 is coupled to L1 cache 320, and texture data is stored in L1 cache 320. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing engines, e.g., primitive engines, SPMs 310, texture units 315, or preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
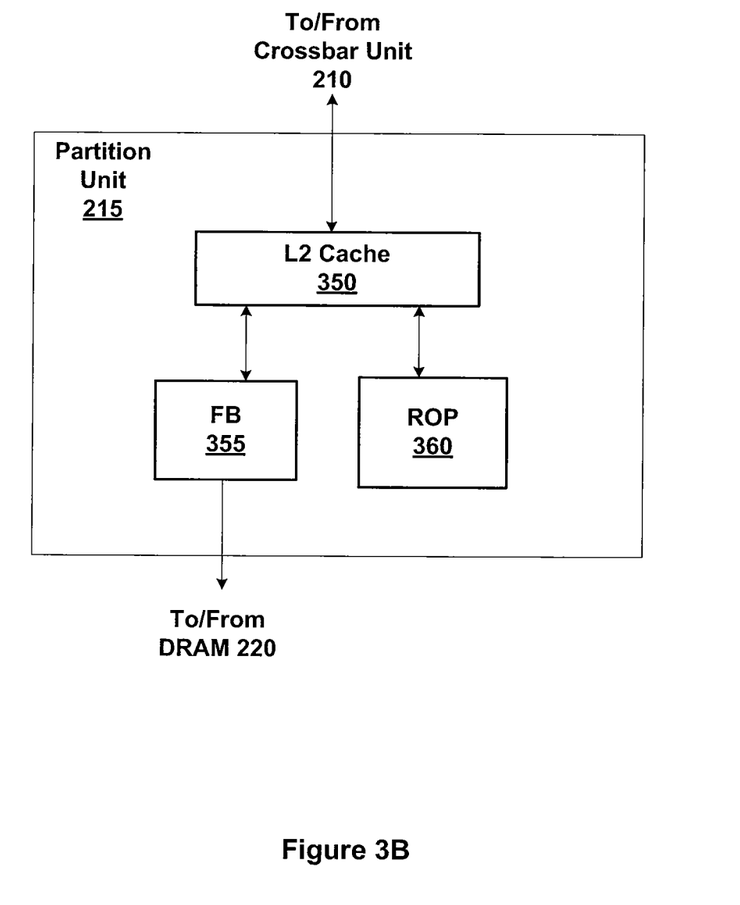
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Figure 4:
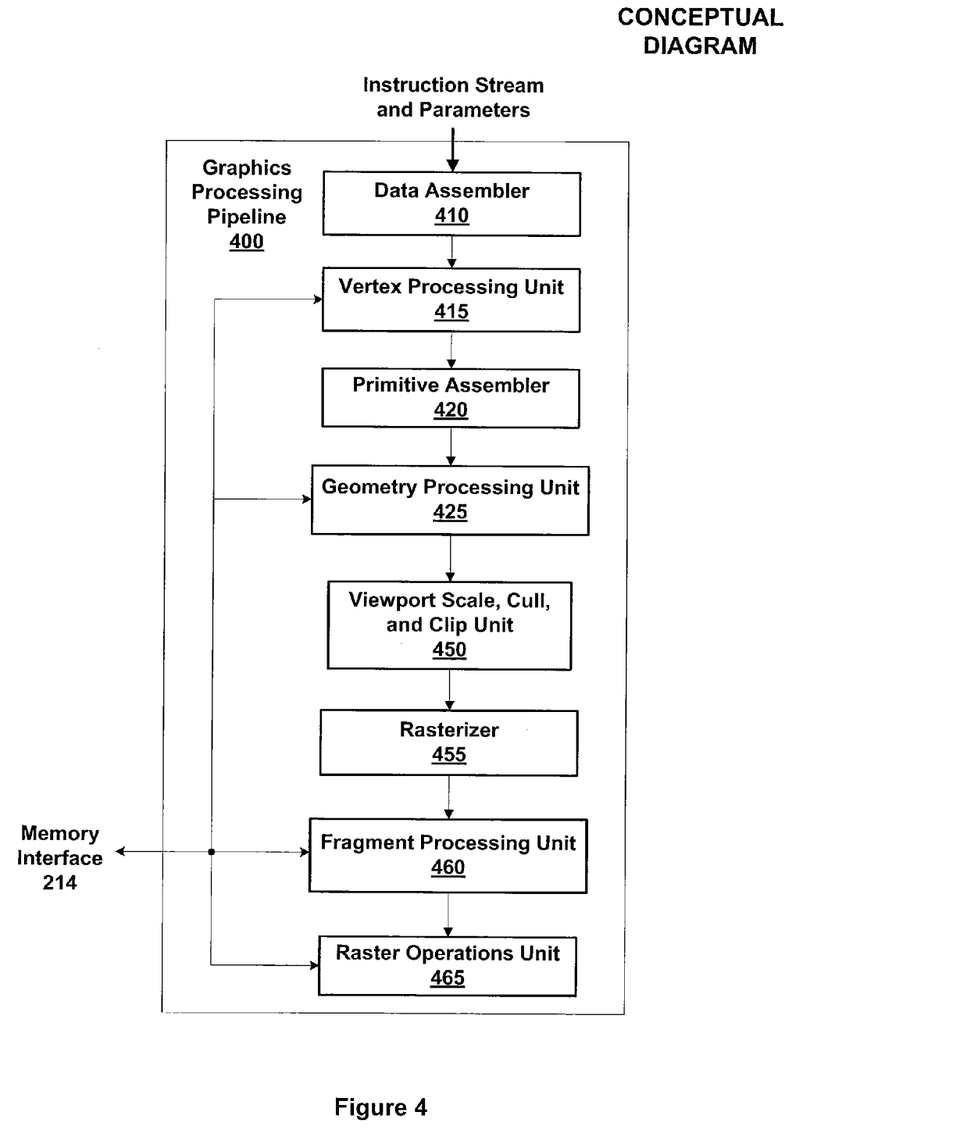
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Translation Look-Aside Buffer Storing Compressed PTE Entries

A translation lookaside buffer (TLB) stores compressed cache lines simultaneously and enables fully general address translation from virtual to physical memory spaces to support the flexible allocation of small buffers or memory data structures. Virtual addressing divides the virtual address space into pages, with each page covering a range of the virtual address space. A TLB stores the physical addresses that correspond to virtual addresses in a page table. The complete page table, which maps portions of the virtual address space that are allocated to portions of the physical memory, is stored in DRAM 220. Entries of the page table (PTEs) are cached in the TLB. Each PTE describes the mapping of a page of the virtual memory space to a page of the physical memory space and includes the physical address of the virtual memory page. Each PTE may also include fields that define the attributes of the particular virtual memory page, e.g., read-only, privileged, and data format.

The PTEs may be compressed using several different formats. Some formats may advantageously be capable of storing more PTEs than other formats. The size of the address space covered by a cache line depends on the page size and compression format of the PTEs stored in the cache line. All cache lines in a particular TLB have the same number of bits, where the number of bits is set to be the size of the compression format that requires the most bits.

Figure 5A:
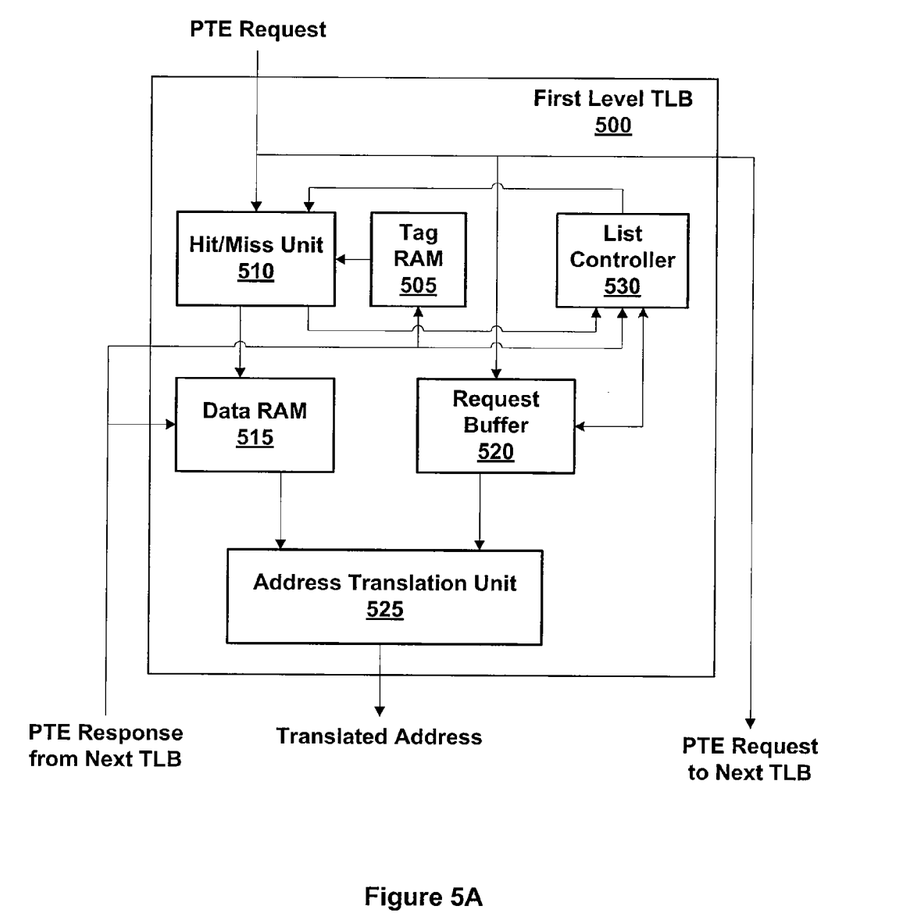
FIG. 5A is a block diagram of a first level TLB within the MMU of FIG. 3A, according to one embodiment of the present invention.
Figure 5B:
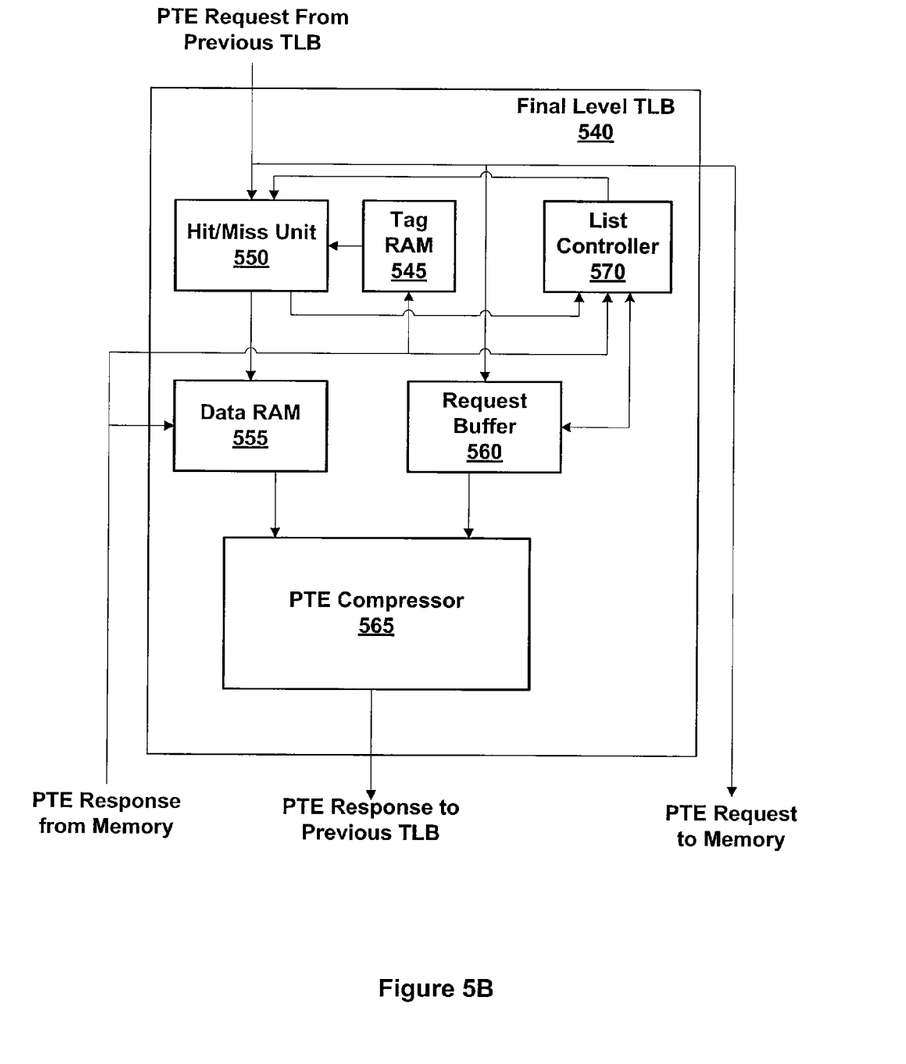
FIG. 5B is a block diagram of a final level TLB within the MMU of FIG. 3A, according to one embodiment of the present invention.

FIG. 5A is a block diagram of a first level TLB 500 within the MMU 328 of FIG. 3A, according to one embodiment of the present invention. In a parallel processing system, the MMU 328 may include multiple TLBs. Often, these multiple TLBs are arranged as a hierarchy, with small caches associated with individual processing units (to provide necessary address translation bandwidth), and fewer, larger second- or third-level caches. The second- and third-level caches provide backup to the first level so misses in the first-level cache do not require additional PTE fetches from memory. The first level TLB 500 may be a first, second, or any higher-level cache and operates in conjunction with a final level TLB 540, which is shown in FIG. 5B.

As shown, the first level TLB 500 includes a hit/miss unit 510, a tag RAM 505, a Data RAM 515, a request buffer 520, a list controller 530, and an address translation unit 525. The first level TLB 500 receives a PTE request and outputs a translated address, which is a physical address corresponding to the address of a virtual memory page specified by the PTE request. On a cache miss, the first level TLB 500 is configured to output PTE requests to a different TLB, which, in various embodiments may be, for example, a second-level or final-level TLB. The first level TLB 500 receives PTE responses from this other TLB. This configuration allows for lower-level TLBs to provide backup to the first level TLB 500, thereby eliminating unnecessary PTE reads from memory.

A TLB cache line consists of a tag and data. The data is stored in the data RAM 515, and the tag is stored in the tag RAM 505. The size of the TLB data storage provided by an entry of data RAM 515 is referred to as the TLB cache line size. Increasing the cache line size reduces the number of tag storage entries in tag RAM 505 required to map a portion of memory and, also, can reduce the frequency of cache misses. Thus, if a PTE maps M bytes of memory, and the data RAM 515 has N cache lines that hold S page table entries, then the first level TLB 500 can map M*N*S bytes of memory.

Specialized devices, such as PPU 202 of FIG. 2 may need to access both local memory (PP memory 204) and system memory 104. System memory 104 typically has small pages, a size mandated by the operating system (e.g. 4 KB), with an arbitrary physical address associated with each PTE. Further, bandwidth to system memory 104 is typically limited by the memory bridge 105 (e.g., PCIE) that connects the PPU 202 to a chipset or the CPU 102. Such a bandwidth limitation may limit the performance of PPU 202. PP memory 204, attached directly to the PPU 202, typically supports much higher bandwidth, and may support larger pages (e.g. 64 KB or 128 KB). To maximize the effective size of the TLBs and to reduce TLB cache miss frequencies—both of which are important to maintain overall system performance, multiple virtual memory page sizes are required. More specifically, small page sizes for system memory 104 and larger page sizes in the PP memory 204, where the larger page sizes can be viewed as a type of PTE compression and clustering.

When the MMU 328 attempts a virtual memory address to physical memory address translation, a PTE request is received by the first level TLB 500 and the hit/miss unit 510 compares the virtual address specified by the PTE request with the contents of the tag entries stored in tag RAM 505. If the virtual address does not match any of the tags, then the PTE request "misses" the first level TLB 500. If the virtual address matches one of the tags, the PTE request "hits" the first level TLB 500. Because the data RAM 515 has a limited number of cache lines, allocating a cache line to receive data for a miss evicts previously-filled entries.

In a parallel processing system such as a PPU 202, the clients of the MMU 328 typically stream address translation requests to the first level TLB 500 and can usually tolerate a certain amount of delay in receiving a response. If one request misses in the first level TLB 500, then subsequent requests for the same page that are transmitted soon after the one request also miss. Rather than blocking the subsequent requests, which would degrade system performance, the first level TLB 500 is configured to support "miss-under-miss" functionality. If the first level TLB 500 receives a request that matches the tags of a cache line in data RAM 515 with a fill pending, the first level TLB 500 buffers the request by adding the request to a list of requests associated with the cache line that are stored in the request buffer 520. The list controller 530 controls the output of the requests stored in request buffer 520 based on writes to the data RAM 515 to fill a cache line. Once the cache line is filled, the first level TLB 500 begins processing the associated requests stored in the request buffer 520. In one embodiment, a request that hits a filled cache line is processed immediately. In alternative embodiments, the request may be buffered in the request buffer 520 while the first level TLB 500 processes other requests.

When the MMU 328 includes a hierarchy of TLBs, a PTE request that misses in a first level TLB 500 is forwarded to a next TLB in the hierarchy. The next TLB compares the PTE request with tags stored in the next TLB in the hierarchy. If no matches are found, the next TLB forwards the PTE request to yet another next TLB hierarchy. Eventually, the PTE request misses in a final TLB in the hierarchy. To satisfy the miss, the appropriate PTEs are read from PP memory 202 or system memory 104, and a PTE response is created for the final TLB. As each TLB, including the first level TLB 500 receives a PTE response, the PTE data is stored in the data RAM 515 at the appropriate cache line, and the cache line is marked as filled. The first level TLB 500 can then process any PTE requests associated with the filled cache line, including any buffered PTE requests stored in the list controller 530.

FIG. 5B is a block diagram of a final level TLB 540 within the MMU 328 of FIG. 3A, according to one embodiment of the present invention. One or more TLBs 500 may be included within MMU 328 along with a final level TLB 540 configured as a hierarchy of TLBs, as described above. As shown, the final level TLB 540 includes a hit/miss unit 550, a tag RAM 545, a data RAM 555, and request buffer 560, a list controller 570, and a PTE compressor 565. The hit/miss unit 550, tag RAM 545, list controller 570, data RAM 555, and request buffer 560 perform the same functions as hit/miss unit 510, tag unit 505, list controller 530, data RAM 515, and request buffer 520, respectively, previously described herein. When a single-level TLB hierarchy is implemented by the MMU 328, the final level TLB 540 is the only TLB and includes the address translation unit 525 to output a translated address. The final level TLB 540 receives a PTE request (from a previous TLB when a TLB hierarchy is used) and outputs compressed PTEs. The final level TLB 540 is configured to output PTE requests that result in a cache miss to PP memory 202 or system memory 104 to read the PTE entries. The final level TLB 540 receives PTE responses from PP memory 202 or system memory 104 and outputs PTE responses to the previous TLB.

Compressing multiple PTEs is possible when adjacent PTEs have common attributes. Adjacent PTEs may be physically contiguous or may have other attributes in common. In such cases, storing complete PTEs in the data rams 515 and 555 wastes storage. If multiple PTEs that have common attributes can be stored in a compressed format in a cache line, then the effective size of RAM 515 and 555 may be increased, and cache miss frequencies are reduced. However, compressing all PTE entries is generally not possible since small surfaces and memory objects (with potentially differing attributes) typically need to be allocated using the smallest number of virtual memory pages possible to avoid memory wastage.

Each time the MMU 328 reads a PTE from memory, a block of PTEs is fetched. The PTE compressor 565 creates the highest density format that includes the target PTE, e.g., the PTE specified by the PTE request and one or more other PTEs in the block of PTEs. Thus, the cache line includes the target PTE and may also include additional PTEs that were not specified in the original PTE request. Several different compression techniques may be used to store multiple PTEs per cache line. For example, common fields for multiple PTEs may be stored once for a cache line. One cache line may be used to map multiple physically contiguous pages. If the physical pages are not physically contiguous, but lie within a certain address range, then a single base with multiple offsets may be used, which typically requires less memory than storing the physical addresses for multiple PTEs. A common field compression technique packs twice as many PTEs per cache line compared with no compression of the PTEs. A base-offset compression technique packs four times as many PTEs per cache line compared with no compression of the PTEs. A contiguous page compression technique may be used to pack PTEs more densely than the other compression methods, but is limited to the same density as base-offset compression. The contiguous page compression requires less bandwidth when transferring data between TLBs. The PTE compressor 565 may be configured to implement only a single compression technique or to implement multiple compression techniques in parallel and then select the most effective compression format that achieves the greatest density to pack more information into a cache line.

The following example is helpful in understanding the advantages of compressing PTEs. Consider a PTE that contains a physical address PA[27:0], an attribute Q[16:0], an attribute R[9:0], an attribute S[3:0], and a "valid" flag. When the unique format is used to represent four PTEs that cannot be compressed, 4*60=240 bits are needed to store all of the unique fields for the PTEs. When the common format is used to represent eight PTEs, with one copy of attribute R and all other fields unique, 410 bits are required. When the common format is used to represent eight PTEs, with one copy of attribute Q and all other fields unique, 361 bits are required. When the base-offset format is used to represent sixteen PTEs with one copy of each attribute Q, R, S, 16 valid flags, a base (B[11:0]), and 16 offsets (0[21:0]), 411 bits are required. When the contiguous format is used to represent sixteen PTEs with 16 valid flags and one copy of all of the other fields, only 75 bits are required. With compression, a 411 bit cache line can map sixteen pages. By contrast, to map sixteen pages without compression requires 960 bits. Therefore, compression can be used to effectively increase the size of the data RAMs 515 and 555.

The block of PTEs read from memory to satisfy a PTE request may include a mix of valid and invalid PTEs as indicated by the valid flags. To optimize the amount of compression, the PTE compressor 565 is configured to ignore the contents of invalid PTEs. To make compression repeatable, the PTE compressor 565 is configured to choose a valid PTE as the reference PTE. The reference PTE determines the value of the common fields in the compression format. The PTE compressor 565 computes the base address for base-offset and contiguous page formats using the physical address of the reference PTE. If the target PTE is valid, then the PTE compressor 565 uses the target PTE as the reference. If the target PTE is invalid, then the PTE compressor 565 must choose a different valid PTE as the reference. The reference PTE is a valid PTE in the smallest format that contains both the target PTE and a valid PTE. The chosen format may be larger, but not smaller, than the smallest format that contains both the target PTE and a valid PTE. Such a configuration helps ensure that the PTE compressor 565 produces the same compressed results regardless of the target PTE.

Without the repeatability described above, cache lines with different formats can represent overlapping memory spaces. The hit/miss unit 510 would not be able to properly determine which of the cache lines should receive new requests when a PTE request hits more than one cache line. Two requests to the same virtual memory page could end up on different cache lines, causing request ordering problems since the TLBs are designed to preserve request order on a cache line basis. Any sequence of requests to a particular virtual memory page will be translated in the order received. Specific rules for assigning requests to cache lines prevent ordering errors.

Figure 6:
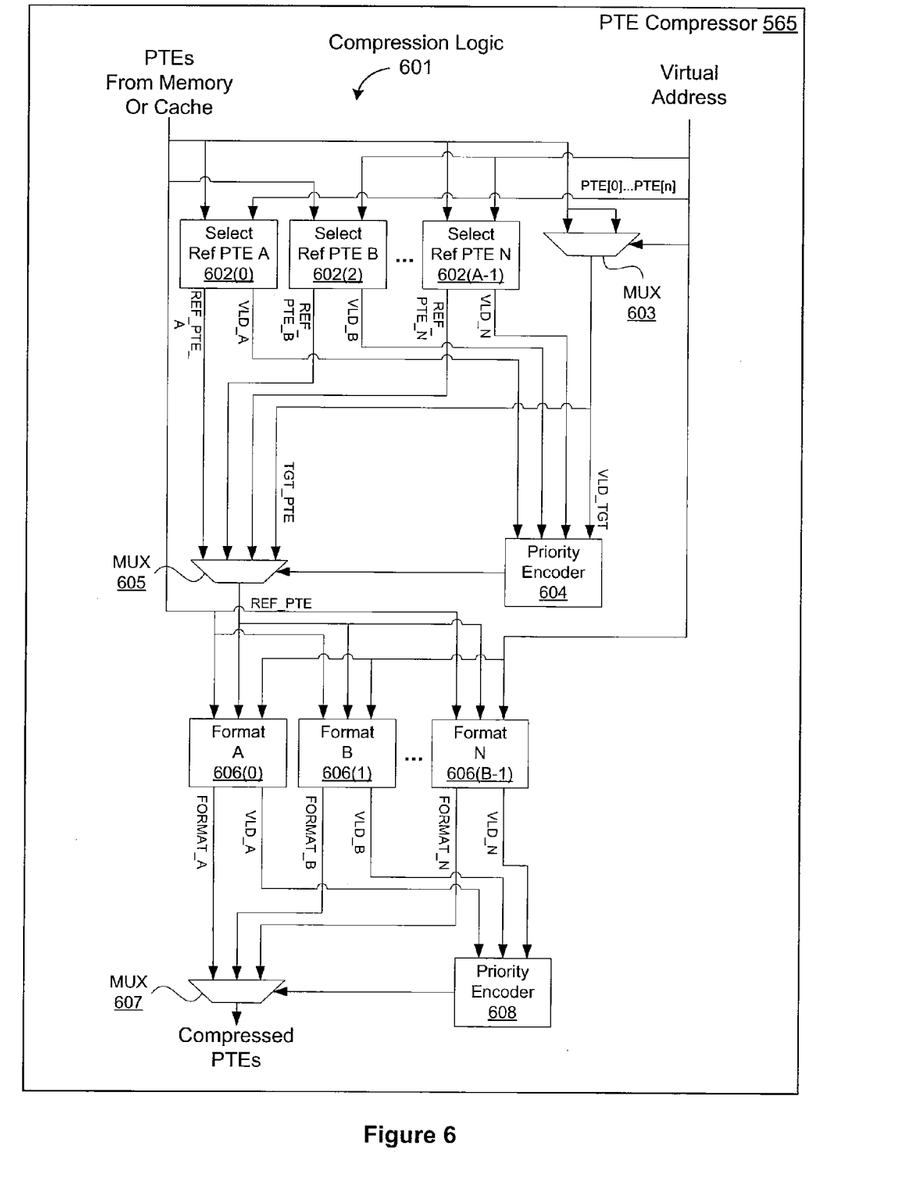
FIG. 6 is a block diagram of compression logic within the MMU of FIG. 3A, according to one embodiment of the present invention.
Figure 7A:
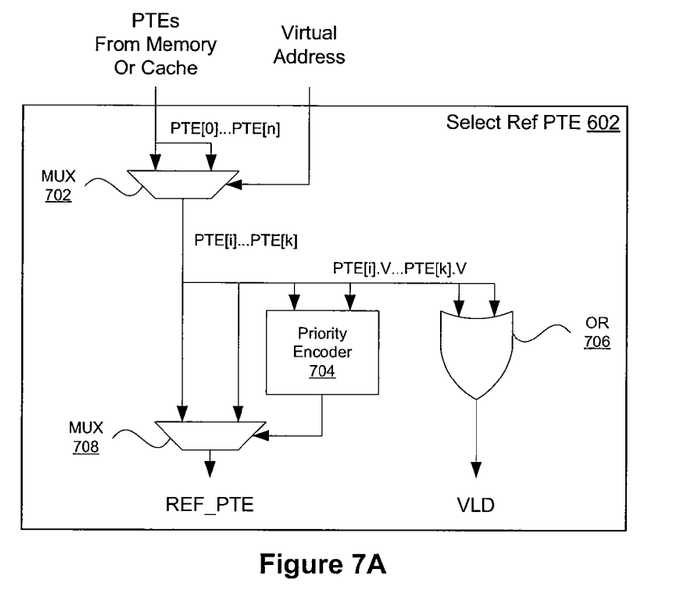
FIG. 7A is a block diagram of a select reference PTE unit within the compression logic of FIG. 6, according to one embodiment of the present invention.

FIG. 6 is a block diagram of compression logic 601 within the PTE compressor 565 of FIG. 5B, according to one embodiment of the invention. As shown, compression logic 601 includes a number A of select reference PTE units 602, where A≥1. In operation, each select reference PTE unit 602 examines a different number of PTEs, where at least one of the PTEs is the target PTE. The reference PTE is output by the select reference PTE unit 602 that receives the fewest number of PTEs and also receives at least one valid PTE. The compression logic 601 also includes a MUX 603, a priority encoder 604, and a MUX 605 which, in conjunction with the select ref units 602, output an appropriate reference PTE as an input to a number of B format units 606. Internal logic of a select reference PTE unit 602 is shown in FIG. 7A, where each select reference PTE unit 602 includes a MUX 702, a priority encoder 704, an OR block 706, and a MUX 708.

Figure 7B:
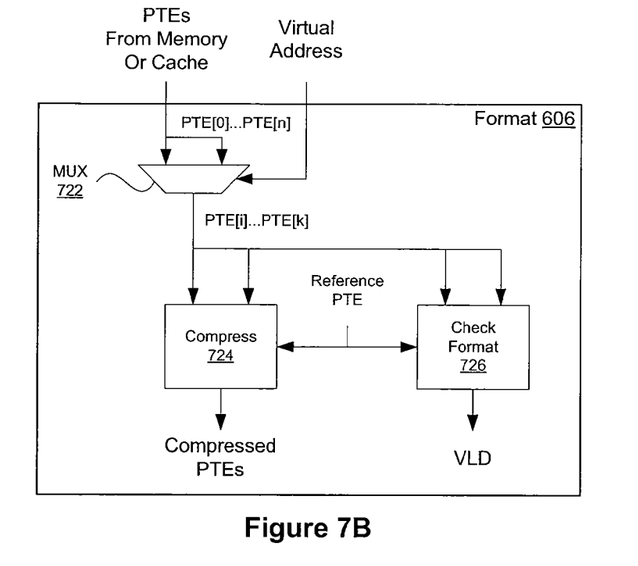
FIG. 7B is a flow diagram of a format unit within the compression logic of FIG. 6, according to one embodiment of the present invention.

Compression logic 601 also includes the B format units 606, where B≥1. Each format unit 606 is configured to compress the PTE inputs into one of the formats described above, such as common-field or base-offset. Again, at least one of the PTE inputs is the target PTE. Each format unit 606 checks the PTE inputs to determine whether they are compressible to the format in which the format unit 606 is configured to compress. Again, invalid PTE inputs are ignored. The compression logic 601 also includes a MUX 607 and a priority encoder 608, which, in conjunction with the format units 606, outputs an optimal compression format for the PTE inputs. In one embodiment, the compression logic 601 selects a format that compresses the greatest number of PTE inputs. If two or more formats include an equal number of PTEs, the format with the fewest bits is chosen. Internal logic of a format unit 606 is shown in FIG. 7B, and includes a MUX 722, a compression unit 724, and a check format unit 726. The check format unit compares PTE[i] through PTE[k] to the reference PTE to see if they are compressible to the format created by compression unit 724.

Figure 8:
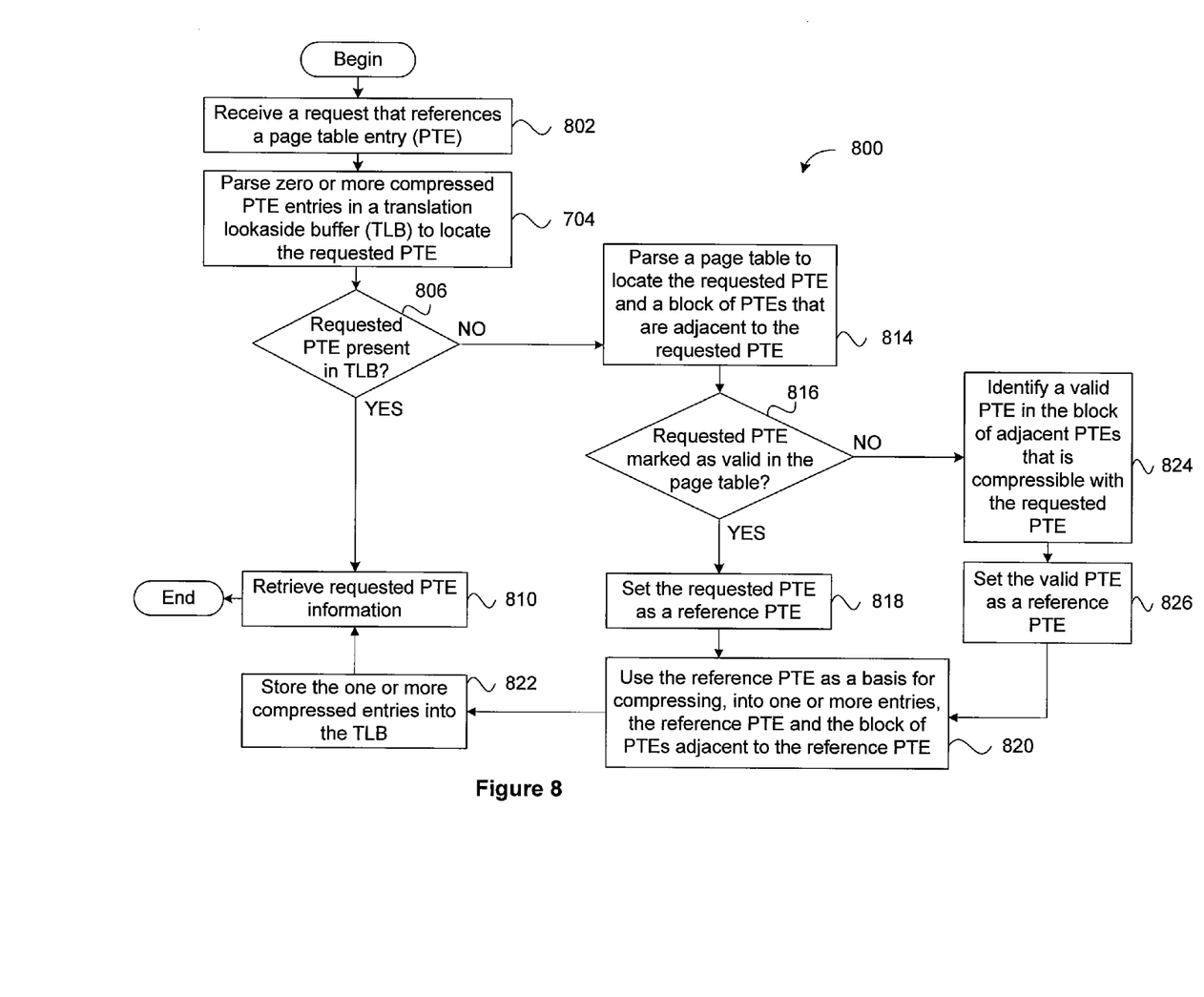
FIG. 8 is a flow diagram showing steps for compressing a PTE read from a memory prior to storing the PTE in a cache, according to one embodiment of the present invention.

FIG. 8 is a flow diagram showing steps for compressing a PTE read from PP memory 202 or system memory 104 prior to storing the PTE in a TLB 500, according to one embodiment of the present invention. At step 802, the MMU 328 receives a request that references a specific page table entry (PTE). At step 804, the MMU 328 parses zero or more compressed PTE entries in the translation lookaside buffer (TLB) 500 in attempt to locate the requested PTE.

At step 806, the MMU 328 determines whether the requested PTE is present in the TLB 500. In one embodiment, the MMU 328 parses each of the compressed PTE entries and compares their attributes to the requested PTE. If, at step 806, the MMU 328 determines that the requested PTE is not present in the TLB 500, then the method 800 proceeds to step 814.

At step 814, the MMU 328 parses a page table included in the DRAM 220 in an attempt to locate the requested PTE and a block of PTEs that are adjacent to the requested PTE. The requested PTE may be retrieved from the DRAM 220 using any technique known to those skilled in the art. In one embodiment, the MMU 328 is configured to, upon retrieval of the requested PTE, also retrieve X pages that precede the requested PTE and Y pages that follow the requested PTE, where X and Y are dynamically configurable. Retrieving the PTEs that are adjacent to the requested PTE enables the MMU 328 to efficiently compress the PTEs for storage in a cache line within the TLB, as described below. At step 816, the MMU 328 determines whether the requested PTE is marked as valid. As described above, a PTE may be marked as valid or invalid via a bit that is included within the PTE. If, at step 816, the MMU 328 determines that the requested PTE is marked as valid, then the method 800 proceeds to step 818.

At step 818, the MMU 328 sets the requested PTE as a reference PTE. Again, a reference PTE determines the value of the common fields in the compression format. For example, the base address for base-offset and contiguous page formats may be computed from the physical address of the reference PTE. At step 820, the MMU 328 uses the reference PTE as a basis for compressing, into one or more entries, the reference PTE and the block of PTEs that are adjacent to the reference PTE.

At step 822, the MMU 328 stores the one or more compressed entries into the TLB. The method 800 then proceeds to step 810, where the MMU 328 retrieves the requested PTE information from the TLB 500, and the method 800 terminates Referring back now to step 816, if the MMU 328 determines that the PTE is marked as invalid, then the method 800 proceeds to step 824. At step 824, the MMU 328 identifies a valid PTE in the block of adjacent PTEs that is compressible with the requested PTE. At step 826, the MMU 328 sets the valid PTE as the reference PTE. The method then proceeds to step 820, as described above.

Referring back now to step 806, if the MMU 328 determines that the requested PTE is present in the TLB 500, then the method 800 proceeds to step 810, as described above.

Compression of a block of PTEs is possible when adjacent PTEs have common attributes. The block of adjacent PTEs read from memory to satisfy a target PTE request may contain a mix of valid and invalid PTEs as indicated by the valid flags. The compressor chooses a valid PTE as the reference PTE, which determines the value of the common fields in the compression format. If the target PTE is valid, then the compressor uses the target PTE as the reference PTE. If the target PTE is invalid, then the compressor must set the reference PTE as a valid PTE in a smallest format that contains both the target PTE and the valid PTE. The resulting format may be larger, but not smaller, than the smallest format, which helps ensure that the compressor produces the same compressed results regardless of the target PTE.

The compression techniques described herein increase the effective size of a cache without requiring physical modification of the cache. Increasing the effective size of the cache decreases the frequency of cache misses that occur when PTE requests are processed, thereby enhancing the efficiency of the systems described herein.

Although the TLBs are described in the context of a graphics processing pipeline, the techniques are applicable to other virtual memory systems that benefit from fast access to portions of memory with certain coherence properties, yet at the same time require general access to any portion of memory.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for compressing page table entries (PTEs) prior to storing the PTEs in a translation look-aside buffer (TLB), comprising:
   receiving a page table entry (PTE) request for a PTE that is not stored in the TLB;
   retrieving, from a memory, the PTE as well as a plurality of PTEs that are adjacent to the PTE;
   compressing the PTE and the plurality of PTEs into a single cache line; and
   storing the cache line in the TLB.

2. The method of claim 1, wherein, if the PTE is marked as valid, the PTE is used as a reference PTE for determining whether any common information exists between the PTE and the plurality of PTEs.

3. The method of claim 2, wherein each PTE included in the plurality of PTEs that is marked as invalid is ignored when determining whether any common information exists between the reference PTE and the plurality of PTEs.

4. The method of claim 3, wherein the common information is an attribute field that is associated with the reference PTE and the valid PTEs included in the plurality of PTEs.

5. The method of claim 3, wherein the common information is a physical address that is contiguous across the reference PTE and the valid PTEs included in the plurality of PTEs.

6. The method of claim 3, wherein the common information is a physical address that is offset from a common base address across the reference PTE and the valid PTEs included in the plurality of PTEs.

7. The method of claim 1, wherein, if the PTE is marked as invalid, a PTE included in the plurality of PTEs that is marked as valid is used as a reference PTE for determining whether any common information exists between the plurality of PTEs.

8. The method of claim 7, wherein each PTE included in the plurality of PTEs that is marked as invalid is ignored when determining whether any common information exists between the reference PTE and the plurality of PTEs.

9. The method of claim 8, wherein the common information is an attribute field that is associated with the reference PTE and the valid PTEs included in the plurality of PTEs.

10. The method of claim 8, wherein the common information is a physical address that is contiguous across the reference PTE and the valid PTEs included in the plurality of PTEs.

11. The method of claim 8, wherein the common information is a physical address that is offset from a common base address across the reference PTE and the valid PTEs included in the plurality of PTEs.

12. A memory management unit (MMU) configured to compress page table entries (PTEs) prior to storing the PTEs, the MMU comprising:
 a translation lookaside buffer (TLB); and
 a PTE compression unit, configured to:
  receive a page table entry (PTE) request for a PTE that is not stored in the TLB;
  retrieve, from a main memory, the PTE as well as a plurality of PTEs that are adjacent to the PTE;
  compress the PTE and the plurality of PTEs into a single cache line; and
  store the cache line in the TLB.

13. The memory management unit of claim 12, wherein, if the PTE is marked as valid, the PTE is used as a reference PTE for determining whether any common information exists between the PTE and the plurality of PTEs.

14. The memory management unit of claim 13, wherein each PTE included in the plurality of PTEs that is marked as invalid is ignored when determining whether any common information exists between the reference PTE and the plurality of PTEs.

15. The memory management unit of claim 14, wherein the common information is an attribute field that is associated with the reference PTE and the valid PTEs included in the plurality of PTEs.

16. The memory management unit of claim 14, wherein the common information is a physical address that is contiguous across the reference PTE and the valid PTEs included in the plurality of PTEs.

17. The memory management unit of claim 12, wherein, if the PTE is marked as invalid, a PTE included in the plurality of PTEs that is marked as valid is used as a reference PTE for determining whether any common information exists between the plurality of PTEs.

18. The memory management unit of claim 17, wherein each PTE included in the plurality of PTEs that is marked as invalid is ignored when determining whether any common information exists between the reference PTE and the plurality of PTEs.

19. The memory management unit of claim 18, wherein the common information is a physical address that is contiguous across the reference PTE and the valid PTEs included in the plurality of PTEs.

20. A computing device configured to compress page table entries (PTEs) prior to storing the PTEs, the system comprising:
 a host processor coupled to a main memory; and
 a graphics adapter having a memory management unit (MMU), the MMU comprising a translation lookaside buffer (TLB) and a PTE compression unit, wherein the PTE compression unit is configured to:
  receive a page table entry (PTE) request for a PTE that is not stored in the TLB;
  retrieve, from the main memory, the PTE as well as a plurality of PTEs that are adjacent to the PTE;
  compress the PTE and the plurality of PTEs into a single cache line; and
  store the cache line in the TLB.

21. The method of claim 1, further comprising selecting a first compression technique comprising a common field compression technique or a base-offset compression technique, wherein the PTE and the plurality of PTEs are compressed into a single cache line via the first compression technique.

* * * * *